United States Patent [19]

deSilva

[11] Patent Number: 4,789,488
[45] Date of Patent: Dec. 6, 1988

[54] CATALYZED OXYGEN REMOVAL WITH HYDROGEN FOR STEAM GENERATOR SYSTEMS

[75] Inventor: Sunil G. deSilva, Turtle Creek, Pa.

[73] Assignee: Westinghouse Electric Corp., Pittsburgh, Pa.

[21] Appl. No.: 88,991

[22] Filed: Aug. 21, 1987

Related U.S. Application Data

[63] Continuation of Ser. No. 550,660, Nov. 10, 1983, abandoned.

[51] Int. Cl.[4] ............................................. C23F 11/08
[52] U.S. Cl. ..................... 210/750; 210/757; 210/765; 422/14
[58] Field of Search ............... 210/696, 750, 757, 765; 423/580; 422/14

[56] References Cited

U.S. PATENT DOCUMENTS

| | | | |
|---|---|---|---|
| 1,531,989 | 3/1925 | Speller | 210/750 |
| 2,155,435 | 4/1939 | McCoy | 210/696 |
| 3,296,125 | 1/1967 | Hegner | 210/750 |
| 4,009,252 | 2/1977 | Izumi et al. | 423/584 |
| 4,129,502 | 12/1978 | Garrett et al. | 210/750 |
| 4,278,635 | 7/1981 | Kerst | 210/750 |
| 4,557,835 | 12/1985 | Lorentz | 210/750 |
| 4,574,071 | 3/1986 | De Silva et al. | 210/750 |

FOREIGN PATENT DOCUMENTS

79590 5/1983 Japan ............................... 210/757
58-174285 10/1983 Japan .

OTHER PUBLICATIONS

Sienk et al., *Chemistry*, Second Ed. (1961), McGraw-Hill Book Co., pp. 186, 187, 210, 211.
Arthur, *Chemistry for Today*, revised edition, Cambridge Book Co. (1959), pp. 47, 48, 233.

*Primary Examiner*—John Doll
*Assistant Examiner*—Wayne A. Langel
*Attorney, Agent, or Firm*—D. C. Abeles

[57] ABSTRACT

Water for use in steam generation systems, which is contained in a storage tank, is deoxygenated for use in the system by adding hydrogen to a stream of the water and intimately mixing the same, pressurizing the stream to a pressure of 60–150 psig, and contacting the pressurized stream with a catalyst bed of palladium or platinum dispersed on a solid carrier. The hydrogen reacts with the dissolved oxygen in the presence of the catalyst at ambient temperatures, to produce a deoxygenated stream of water containing less than 10 ppb of oxygen. The deoxygenated water can be returned to the storage tank or supplied directly to the steam generation system.

13 Claims, 1 Drawing Sheet

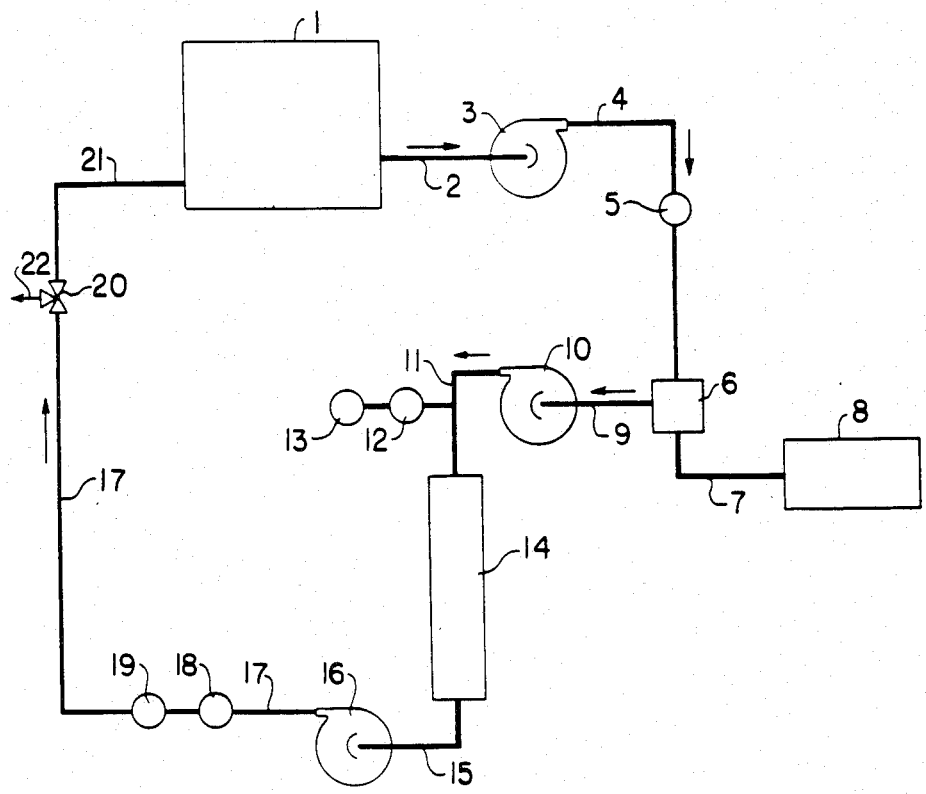

CATALYZED OXYGEN REMOVAL WITH HYDROGEN FOR STEAM GENERATOR SYSTEMS

This application is a continuation of application Ser. No. 550,660, filed Nov. 10, 1983, abandoned.

BACKGROUND OF THE INVENTION

The present invention relates to a method for the removal of dissolved oxygen from the aqueous media used in steam generation systems by the addition of hydrogen to react with the dissolved oxygen in contact with a catalyst.

Dissolved oxygen has been identified as a contributor in the corrosion of components in the primary and secondary coolant systems of nuclear power systems. It has been indicated that even very low levels of dissolved oxygen, even about 20 parts per billion or less, can contribute to pitting, denting and oxidation of copper alloy components of the system. There are numerous water storage tanks both in the primary and secondary systems, such as the condensate storage tank, auxillary feedtank, demineralized water storage tank, reactor makeup tank and refueling water storage that normally contain a supply of stagnant aerated water which, upon introduction of such water into the steam generation system can introduce oxygenated water thereto. Such storage tanks are often located outside a steam generation system enclosure and in cold temperatures, and there is a need to deoxygenate these reservoirs of oxygenated water.

Problems involved with the presence of dissolved oxygen in water and various methods for removal of such oxygen, both physical and chemical, are discussed in the paper, "Saving Energy by Catalytic Reduction of Oxygen in Feedwater", by F. Martinola, presented at the 41st Annual Meeting International Water Conference, at Pittsburgh, Pa. on Oct 20-22, 1980, the contents of said paper being incorporated by reference herein. The Martinola paper discusses the use of a palladium containing polystyrene-based anion exchange resin to aid in the reaction of hydrogen, added to an aqueous medium, with dissolved oxygen in the aqueous medium. In a system described therein, hydrogen is added to water, containing 8 ppm oxygen, which is passed through a mixing tank containing plexiglass rings, and the mixture then flows to a reactor which contains a palladium catalyst. The residual oxygen content of the water after passage through the catalyst column was 0.025 ppm (25 ppb). Other systems using hydrogen and the palladium catalyst gave residual oxygen contents of between about 0.015 ppm to 0.025 ppm (15-25 ppb).

Other systems have previously used hydrogen to remove dissolved oxygen from water. In U.S. Pat. No. 1,725,925, a system is described where oxygen is purged from water by gases such as hydrogen or nitrogen, the system displacing oxygen from the process flow with an inert gas. In U.S. Pat. No. 3,052,527 a method is disclosed using a catalyzed absorbent bed and a separate source of hydrogen gas within the bed which is intermittently maintained in an atmosphere of hydrogen gas. While the method described uses hydrogen to recombine oxygen in the presence of a catalyst, it uses activated carbon as a support medium to hold a palladium catalyst, and hydrogen is injected into the catalyst bed and a limited amount of oxygenated water is processed until the bed is depleted. Then the cycle is repeated, so a to provide only intermittent operation of the system. This use of a non-continuous hydrogen addition is apparently due to the limited slow ability for dissolving hydrogen. In U.S. Pat. No. 3,294,644 a method is described for reducing corrosion conditions in water-cooled reactors with hydrogen additions, with the oxygen controlled using hydrogen to promote the recombination of oxygen originating from radiolysis of water, requiring a radiation flux.

It is an object of the present invention to remove dissolved oxygen from an aqueous media to a value of less than about 10 parts per billion, using a catalyzed hydrogen reaction with the dissolved oxygen.

It is another object of the present invention to remove dissolved oxygen from a supply of water to a value of less than about 10 ppb for use in a steam generation system.

It is a further object of the present invention to remove dissolved oxygen from a supply of water contained in a storage tank, such that the supply of water can be used in a steam generation system without adverse affects on the components of the system.

SUMMARY OF THE INVENTION

The removal of dissolved oxygen from an aqueous media is effected, to give residual values of less than about 10 ppb by weight of dissolved oxygen, by the use of hydrogen and contact with palladium or platinum. In removal of dissolved oxygen from a stream of aqueous media, the stream has hydrogen gas injected therein and intimate mixing of the hydrogen with the aqueous media effected. The intimately mixed stream is then pressurized to a pressure of between 60-150 psig and the pressurized stream contacted with a noble metal selected from palladium and platinum, disposed on a stable carrier material such as an anion exchange resin, for a period of time sufficient to react the hydrogen and dissolved oxygen.

The palladium or platinum metal on the stable carrier is situated in a catalyst bed and the intimately mixed hydrogen and aqueous media are preferably pressurized by the use of a variable speed pump which charges the mixture to the catalyst column. The removal of the dissolved oxygen according to the present process is achieved at ambient temperatures, between about 15°-40° C.

BRIEF DESCRIPTION OF THE DRAWING

The drawing is a schematic representation of an apparatus useful in the present invention, where water from a storage tank is to be deoxygenated according to the present process.

DETAILED DESCRIPTION

The present process provides for the removal of dissolved oxygen from an aqueous media using hydrogen gas to react with the dissolved oxygen, in the presence of a catalyst, at ambient temperature. The present process is especially useful in the removal of dissolved oxygen from water contained in various storage tanks for use in steam generation systems when the content of dissolved oxygen in a circulating aqueous media must be kept at a very low value.

According to the present process, a stream of aqueous media containing dissolved oxygen has hydrogen gas added thereto, by injection, which hydrogen gas will react with dissolved oxygen in the aqueous medium. The amount of hydrogen gas added to the aqueous stream should be approximately a stoichiometric amount to react with the dissolved oxygen and preferably a slight excess over a stoichiometric amount. A ratio of about 1.1:1 to 1.5:1 hydrogen to dissolved oxygen is preferred.

After the addition of the hydrogen gas to the aqueous medium, intimate mixing is carried out, such as by passage of the stream through a precolumn, the precolumn comprising a tube or column containing a plurality of glass beads, or other solid particulate material, which provides a tortuous path for the stream through the precolumn and intimate mixing of the hydrogen gas with the dissolved oxygen in the aqueous medium.

After intimate mixing, the aqueous medium containing the hydrogen gas is charged, under pressure, to a catalyst column. The pressurizing of the aqueous medium is preferably effected by use of a variable speed pump which will pressurize and feed the pressurized stream to a column for contact with the catalyst. The intimately mixed stream of hydrogen gas and aqueous medium should be pressurized to a pressure of between 60–150 pounds per square inch guage (psig), and preferably to about 100 psig, when high hydrogen dissolution is required to remove a high oxygen content in the aqueous media. For example, the use of a pressure of about 60 psig would be sufficient in the deoxygenation of water which contains a low amount of dissolved oxygen, such as 1 ppm oxygen. A higher pressure is needed, such as a pressure of about 100 psig, in the deoxygenation of water which is saturated with dissolved oxygen, an oxygen content of about 8 ppm. This pressurization is needed to rapidly dissolve the hydrogen gas added in a flowing stream prior to introduction to the catalyst column.

The pressurized aqueous media containing the hydrogen gas is contacted with a catalyst bed which comprises a noble metal, selected from palladium and platinum, disposed on a solid carrier medium. The solid carrier should be water-insoluble physically stable under the conditions of the process, and provide a support for finely dispersed palladium or platinum metal. Useful as such a solid carrier is a polystyrene-based ion exchange resin, and especially a polystyrene-based anion exchange resin. Examples of commercially available such palladium-containing, polystyrene-based anion exchange resins are Lewatit OC 1045 and Lewatit OC 1040 sold by Mobay Chemical Corporation.

The palladium or platinum catalyst is preferably retained in a column and the pressurized stream of aqueous media containing the gaseous hydrogen is contacted therewith at ambient temperatures of between about 15°–40° C., preferably at about 25° C.

The contact time of the pressurized aqueous media containing hydrogen gas with the catalyst should be that which is sufficient to lower the dissolved oxygen content of the aqueous media to less than about 10 parts per billion. The specific contact times may vary dependent upon the initial dissolved oxygen content of the aqueous medium, concentration of hydrogen gas added, the amount of palladium or platinum on the carrier, and other factors. Contact times of between about 0.5 to 2 minutes have been found to be sufficient. Such contact time has been found to lower the dissolved oxygen content of an aqueous media to less than 10 ppb and preferably less than 2 ppb.

For optimum efficiency, the catalyst bed should be hydrogen saturated. The impact of the catalyst bed saturation with hydrogen, on the extent of oxygen removal, can be summarized in the following manner.

The extent of oxygen removal is dependent on availability of hydrogen saturated sites where recombination occurs. Oxygen recombination, for hydrogen additions into an unsaturated bed does not yield oxygen removal equivalent to the amount of hydrogen that is added, rather some of the hydrogen is used in saturating the bed. Equilibrium condition in the catalyst bed occurs when the rate of hydrogen addition is equal to the rate of hydrogen consumption, from the catalyst sites, due to recombinations. Under equilibrium conditions, 1 ppm hydrogen added can recombine with 8 ppm oxygen. In instances where the bed is previously saturated, but hydrogen additions are reduced to less than stoichiometric requirements, oxygen removal in excess of that expected are achieved until the saturated catalyst is depleted of hydrogen. This appears to indicate the capability of the process to yield some continual oxygen removal even under temporary terminations of the hydrogen addition.

The drawing schematically illustrates an apparatus for effecting the present method to remove dissolved oxygen from a supply of water contained in a storage tank 1. A stream of water is discharged from storage tank 1 through line 2 to a pump 3, which then passes the stream of water through line 4 which contains a flow meter 5. The stream of water in line 4 passes to a precolumn 6, to which there is also charged a supply of hydrogen gas, through line 7 from a supply 8 of hydrogen gas. The hydrogen gas and water are intimately mixed together in the precolumn 6 and the mixture passes through line 9 to a pump 10, such as a variable speed pump which pressurizes the mixture to a pressure of between 60–150 psig. The pressurized mixture is discharged from pump 10, through line 11, which contains an oxygen content analyzer 12 and hydrogen content analyzer 13. The pressurized mixture then passes to the catalyst column 14, which column contains palladium or platinum metal on a solid carrier support. After contact with the catalyst, the mixture is passed through line 15 to a discharge pump 16 which discharges the deoxygenated water through line 17. In line 17, an oxygen analyzer 18 is used to determine the amount of residual oxygen in the water, while a hydrogen analyzer 19 is used to determine the amount, if any, of residual hydrogen in the water. Line 17 then feeds the deoxygenated water to a valve 20, which permits either passage of the deoxygenated water through line 21 back to the tank 1, or, if desired, through line 22 to a use point for deoxygenated water.

The present process is further illustrated in the following examples, wherein parts are part by weight unless otherwise indicated. The dissolved oxygen content in the examples was determined by use of an Orbisphere 2713 model digital dissolved oxygen analyzer having an accuracy of plus or minus one part per billion.

EXAMPLE I

A stream of water which contained a dissolved oxygen content of 7.5 parts per million (ppm) was passed through a precolumn comprising a 9 inch long stainless steel, two inch interior diameter, pipe packed with 3 mm diameter glass beads, while hydrogen gas in an amount of 1.17 ppm was added thereto. The intimately mixed stream from the precolumn, at a pressure of 15 psig, was passed to a variable speed pump where the stream was pressurized to 80 psig. The pressurized stream at 80 psig, and 23° C., was passed through a column containing a bed of catayst, 1000 ml of Lewatit OC 1045, a palladium-containing, polystyrene based anionic resin. The flow rate of the water was 1000 ml/mm, giving a contact time with the resin of 1 minute. The outlet pressure of the water from the catalyst column was 30 psig. The initial hydrogen content of the water leaving the catalyst column was 0.005 ppm and the initial oxygen content was 2.4 ppm. After 44 minutes flow through the column, the inlet hydrogen content was 1.325 ppm and the inlet oxygen content was 7.85 ppm, while the hydrogen content of water leaving the catalyst column was 0.019 ppm and the oxygen content thereof was only 0.029 ppm (2.9 ppb).

EXAMPLE II

A series of runs were made following the procedure of Example I. The pressures were: 16 psig at the initial flow, 60 psig at introduction to the catalyst column, and 11 psig at the exit of the catalyst column. The temperature of the stream of water was 24° C. The inlet hydrogen and outlet hydrogen contents and the inlet oxygen and outlet oxygen contents (from the catalyst column), at various times were recorded and are listed in Table I:

TABLE I

| Time (min.) | Hydrogen Content (ppm) | | Oxygen Content (ppm) | |
| --- | --- | --- | --- | --- |
| | Inlet | Outlet | Inlet | Outlet |
| 0 | 0.087 | 0.0084 | 7.84 | 7.31 |
| 30 | 0.847 | 0.0055 | 7.40 | 3.3 |
| 60 | 1.38 | 0.0084 | 7.3 | 0.054 |
| 90 | 1.381 | 0.094 | 7.6 | 0.0083 |
| 120 | 1.4 | 0.100 | 7.44 | 0.0038 |

EXAMPLE III

The procedure of Example I was repeated using a flow of water which contained a lower concentration of dissolved oxygen. In Run I, the temperature of the water was 22° C. and the pressures used were: 15 psig at the initial flow; 100 psig at introduction to the catalyst column; and 50 psig at the exit of the catalyst column. In Run 2, the temperature of the water was 23.4° C. and the pressures used were: 12 psig at the initial flow; 80 psig at introduction to the catalyst column; and 30 psig at the exit of the catalyst column. The inlet hydrogen and outlet hydrogen contents and inlet oxygen and outlet oxygen contents (from the catalyst column), at various times were recorded in both runs and are listed in Table II:

TABLE II

| Run No. | Time (min.) | Hydrogen Content (ppm) | | Oxygen Content (ppm) | |
| --- | --- | --- | --- | --- | --- |
| | | Inlet | Outlet | Inlet | Outlet |
| 1 | 0 | 0.096 | 0.0025 | 1.26 | 1.09 |
| | 10 | 0.226 | 0.0084 | 1.00 | 0.089 |
| | 20 | 0.372 | 0.0084 | 1.00 | 0.0299 |
| | 30 | 0.468 | 0.141 | 1.00 | 0.0123 |
| | 40 | 0.479 | 0.209 | 1.04 | 0.0066 |
| | 50 | 0.462 | 0.215 | 1.08 | 0.0045 |
| 2 | 0 | 0.068 | 0.0025 | 1.04 | 0.551 |
| | 10 | 0.099 | 0.0055 | 1.02 | 0.304 |
| | 20 | 0.130 | 0.0025 | 1.00 | 0.172 |
| | 30 | 0.138 | 0.0055 | 1.00 | 0.137 |
| | 40 | 0.141 | 0.0055 | 0.99 | 0.113 |
| | 50 | 0.138 | 0.0084 | 1.05 | 0.120 |
| | 60 | 0.110 | 0.0055 | 0.98 | 0.061 |
| | 70 | 0.195 | 0.0055 | 0.99 | 0.0045 |
| | 80 | 0.200 | 0.0020 | 1.02 | 0.0022 |
| | 90 | 0.183 | 0.0202 | 1.00 | 1.0016 |
| | 100 | 0.181 | 0.0023 | 1.06 | 0.0014 |

EXAMPLE IV

As an example showing the need for adequate pressures at the entrance of the feed stream to the catalyst column, the system described in Example I was used, with a flow rate of 1800 ml/min. In Run No. 3, pressures were as follows: 12 psig at initial flow; 60 psig at the entrance to the catalyst column and 12 psig at the exit of the column. The temperature of the water was 25.3° C. The hydrogen and oxygen inlet and outlet contents were taken and are listed in Table III. After 80 minutes operation, a gas buildup at the top of the catalyst corner had developed to a depth of 2" from the top of the column. This gas was bled off from the column and the process continued for 70 more minutes, at which a further 2" gas buildup had occured at the top of the column. The run was then stopped. In contrast, in Run No. 4, where the pressures were as follows: 12 psig at initial flow; 80 psig at the entrance to the catalyst column; and 30 psig at the exit of the column, with a temperature of 26° C. used, the removal of dissolved oxygen to a residual content of 0.0053 ppm (Table III) was effected with no noticeable gas buildup in the column.

TABLE III

| Run No. | Time (min.) | Hydrogen Content (ppm) | | Oxygen Content (ppm) | |
| --- | --- | --- | --- | --- | --- |
| | | Inlet | Outlet | Inlet | Outlet |
| 3 | 0 | 0.115 | 0.005 | 8 | 7.4 |
| | 80[a] | 0.762 | 0.0056 | 8 | 4.4 |
| | 150 | 1.09 | 0.005 | 8.02 | 1.59 |
| 4 | 0 | 0.231 | 0.005 | 7.8 | 2.5 |
| | 50 | 1.27 | 0.135 | 7.45 | 0.0053 |

[a]gas above catalyst bed bled off

EXAMPLE V

As an example showing the need for adequate pressures, as well as intimate mixing of the hydrogen and aqueous medium prior to contact with the palladium, the system of Example I was operated without a precolumn and a pump. The conditions of Example I were repeated, except that the pressures were: 24 psig at initial flow; 30 psig at the entrance to the catalyst column; and 18 psig at the exit of the column. The hydrogen and oxygen inlet and outlet contents were taken and are listed in Table IV. After 30 minutes operation, a 2" gas buildup had developed at the top of the catalyst column. After 42 minutes the gas buildup had grown to 4". After 50 minutes, the gas buildup was bled off from the column. The pump was then placed into operation in the system, with increase in the pressures as follows: 26 psig initial, 40 psig at entrance to the column, and 13 psig at the exit of the column. After continued operation at these conditions, a value of 0.37 ppm (37 ppb) was the lowest oxygen content achieved in the deoxygenated water.

TABLE IV

| Time  | Hydrogen Content (ppm) | | Oxygen Content (ppm) | |
|-------|-------|--------|-------|--------|
| (min.) | Inlet | Outlet | Inlet | Outlet |
| 0     | 0.005 | 0      | 8.2   | 6      |
| 12    | 0.960 | 0      | 7.2   | 1.2    |
| 50    | 1.200 | 0.240  | 7.14  | 0.0415 |
| 66[a] | 1.200 | 0.096  | 7.58  | 0.037  |

[a] gas bled off from column

As is illustrated, the present process provides for the deoxygenation of water to values below 10 ppb, and even below 2 ppb, such that the deoxygenated water can be used in steam generating systems without corrosion of the components of the system.

What is claimed is:

1. A method for removing dissolved oxygen from a supply of aqueous medium comprising:
    discharging a stream of aqueous medium containing dissolved oxygen from said supply thereof;
    injecting hydrogen gas into said discharged stream of aqueous medium;
    intimately mixing said hydrogen with said aqueous medium;
    pressurizing the intimately mixed stream to a pressure of between 60–150 psig; and
    contacting said pressurized, intimately mixed stream, for a period of time of 0.5 to 2 minutes, at a temperature of between 15°–40° C., with an effective amount of a noble metal selected from the group consisting of palladium and platinum, dispersed on a stable carrier material, for a period of time effective to react the hydrogen and dissolved oxygen to produce a deoxygenated aqueous medium stream having a dissolved oxygen content of below about 2 parts per billion by weight.

2. The method as defined in claim 1 wherein said supply of aqueous media is contained within a storage tank and wherein said deoxygenated aqueous media stream is returned to said storage tank.

3. The method as defined in claim 1 wherein said noble metal is dispersed on a polystyrene-based anion exchange resin.

4. The method as defined in claim 1 wherein said hydrogen and aqueous medium are intimately mixed by passage thereof through a column containing solid particulate matter.

5. The method as defined in claim 4 wherein said solid particulate matter comprises glass beads.

6. The method as defined in claim 1 wherein said noble metal is palladium.

7. The method as defined in claim 1 wherein said noble metal is platinum.

8. In a method for removing dissolved oxygen from a supply of aqueous medium contained in a storage tank, for use in a steam generation system through which the aqueous medium is to be circulated, wherein prior to introduction into the steam generation system, the dissolved oxygen content of said aqueous medium is reduced, the improvement comprising:
    discharging a stream of aqueous medium containing dissolved oxygen from said storage tank;
    injecting hydrogen gas into said discharged stream of aqueous medium;
    intimately mixing said hydrogen with said aqueous medium by passage thereof through a column containing solid particulate matter;
    pressurizing the intimately mixed stream to a pressure of between 60–150 psig; and
    contacting said pressurized, intimately mixed stream, for a period of time of 0.5 to 2 minutes, at a temperature of between 15°–40° C., with an effective amount of a noble metal selected from the group consisting of palladium and platinum, dispersed on a stable carrier material, for a period of time effective to react the hydrogen and dissolved oxygen to produce a deoxygenated aqueous medium stream having a dissolved oxygen content of below about 2 parts per billion by weight.

9. The method as defined in claim 8 wherein the solid particulate the matter in said column comprises glass beads.

10. The method as defined in claim 8 wherein said deoxygenated aqueous medium stream is returned to said storage tank.

11. The method as defined in claim 8 wherein said deoxygenated aqueous medium stream is introduced into said steam generation system.

12. The method as defined in claim 8 wherein said noble metal is dispersed on a polystyrene-based anion exchange resin.

13. The process as defined in claim 12 wherein said noble metal is palladium.

* * * * *